United States Patent
Kung (10) Patent No.: US 6,718,182 B1
(45) Date of Patent: Apr. 6, 2004

(54) MODULARIZED FUNCTIONALITY ENHANCEMENT FOR A CELLULAR TELEPHONE

(75) Inventor: Shao-Tsu Kung, Taipei (TW)

(73) Assignee: Compal Electronics, Inc., Taipei (TW)

( * ) Notice: Subject to any disclaimer, the term of this patent is extended or adjusted under 35 U.S.C. 154(b) by 557 days.

(21) Appl. No.: 09/664,586

(22) Filed: Sep. 18, 2000

(51) Int. Cl.⁷ .............................. H04B 1/38; H04M 1/00
(52) U.S. Cl. .................. 455/556.1; 455/557; 455/558; 455/90; 455/74; 455/66.1; 455/550.1; 455/344; 455/347
(58) Field of Search ................................ 455/556.1, 557, 455/550, 90, 344, 347, 348, 349, 351, 66, 556, 558

(56) References Cited

U.S. PATENT DOCUMENTS

| | | | | | |
|---|---|---|---|---|---|
| 5,249,218 A | * | 9/1993 | Sainton | .................. | 455/418 |
| 5,353,334 A | * | 10/1994 | O'Sullivan | ................. | 455/557 |
| 5,465,401 A | * | 11/1995 | Thompson | ................. | 455/558 |
| 5,727,160 A | * | 3/1998 | Ganesan et al. | ............ | 709/249 |
| 5,903,849 A | * | 5/1999 | Selin et al. | ................. | 455/557 |
| 5,929,848 A | * | 7/1999 | Albukerk et al. | ........... | 345/700 |
| 6,138,036 A | * | 10/2000 | O'Cinneide | ................. | 455/557 |
| 6,181,954 B1 | * | 1/2001 | Monroe et al. | ............. | 455/557 |
| 6,192,255 B1 | * | 2/2001 | Lewis et al. | ................ | 455/558 |

* cited by examiner

*Primary Examiner*—Vivian Chin
*Assistant Examiner*—Marceau Milord
(74) *Attorney, Agent, or Firm*—Winston Hsu (57) ABSTRACT

A cellular telephone has a processing circuit for controlling the operations of the cellular telephone, a keypad to provide input from a user, a display to provide visual output to the user, and an input/output (I/O) port electrically connected to the processing circuit. A peripheral module has a peripheral circuit for performing a peripheral function, a memory, and a connecting port for connecting the peripheral circuit and the memory to the I/O port of the cellular telephone. The memory of the peripheral module has a peripheral driver program for controlling operations of the peripheral circuit. After the connecting port of the peripheral module is electrically connected to the I/O port of the cellular telephone, the processing circuit executes the peripheral driver program so as to perform the peripheral function.

13 Claims, 5 Drawing Sheets

MODULARIZED FUNCTIONALITY ENHANCEMENT FOR A CELLULAR TELEPHONE

BACKGROUND OF THE INVENTION

1. Field of the Invention

The present invention relates to a cellular telephone. More specifically, the present invention discloses a cellular telephone onto which can be connected a module to enhance the functionality of the cellular telephone.

2. Description of the Prior Art

Over the years, cellular telephones have become increasingly common. In conjunction with this, the internal processing circuitry of cellular telephones has become more powerful, with faster processors and more memory. Indeed, many modern cellular telephones are, in fact, highly portable and sophisticated computers. Such advances have encouraged the manufacturers of cellular telephones to include more and more options and functions with their cellular telephones. A drawback to this, though, is a perception in the marketplace that any cellular telephone that a user may buy will quickly become obsolete in view of ever-widening options being placed into newer models. Unlike personal computers, which may be upgraded and expanded to a certain degree by changing or adding hardware within the casing, cellular telephones currently offer no such possibilities. Once purchased, a user can expect the hardware and software within a cellular telephone to remain virtually unchanged over the lifetime of the device. Not only can this be a source of dissatisfaction to users, but it is actually quite wasteful, for many new options of a new cellular telephone are often simple additions to the basic functionality of an older model.

SUMMARY OF THE INVENTION

It is therefore a primary objective of this invention to provide a cellular telephone to which can be connected a module for enhancing the functionality of the cellular telephone.

The present invention, briefly summarized, discloses a peripheral module for enhancing the functionality of a cellular telephone. The cellular telephone has a processing circuit for controlling the operations of the cellular telephone, a keypad to provide input from a user, a display to provide visual output to the user, and an input/output (I/O) port electrically connected to the processing circuit. The peripheral module has a peripheral circuit for performing a peripheral function, a memory, and a connecting port for connecting the peripheral circuit and the memory to the I/O port of the cellular telephone. The memory of the peripheral module has a peripheral driver program for controlling operations of the peripheral circuit. After the connecting port of the peripheral module is electrically connected to the I/O port of the cellular telephone, the processing circuit executes the peripheral driver program so as to perform the peripheral function.

It is an advantage of the present invention that the peripheral module can enhance the basic functionality of the cellular telephone. Consequently, the useful lifetime of the cellular telephone can be lengthened, and perceived obsolescence avoided.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
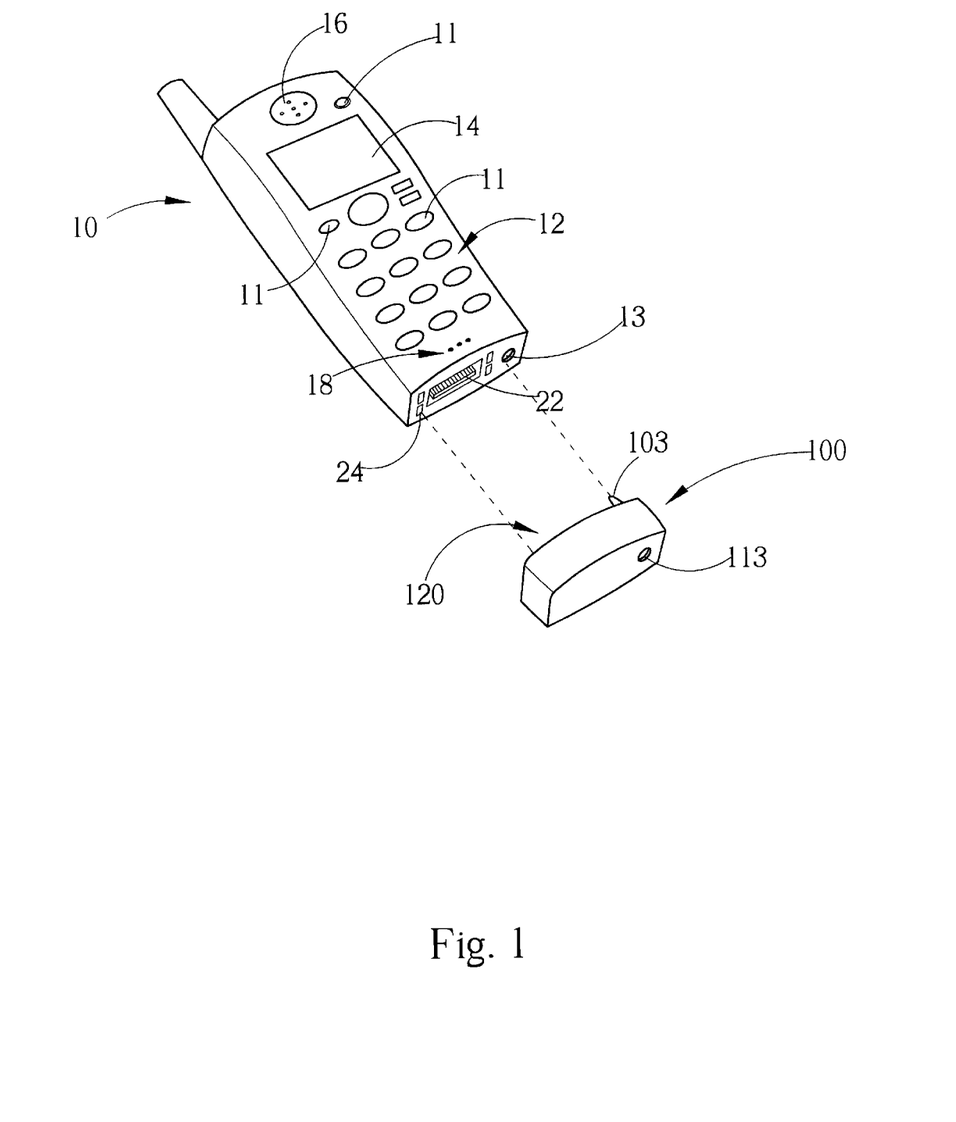
FIG. 1 is a perspective view of a cellular telephone and peripheral module according to the present invention.
Figure 2:
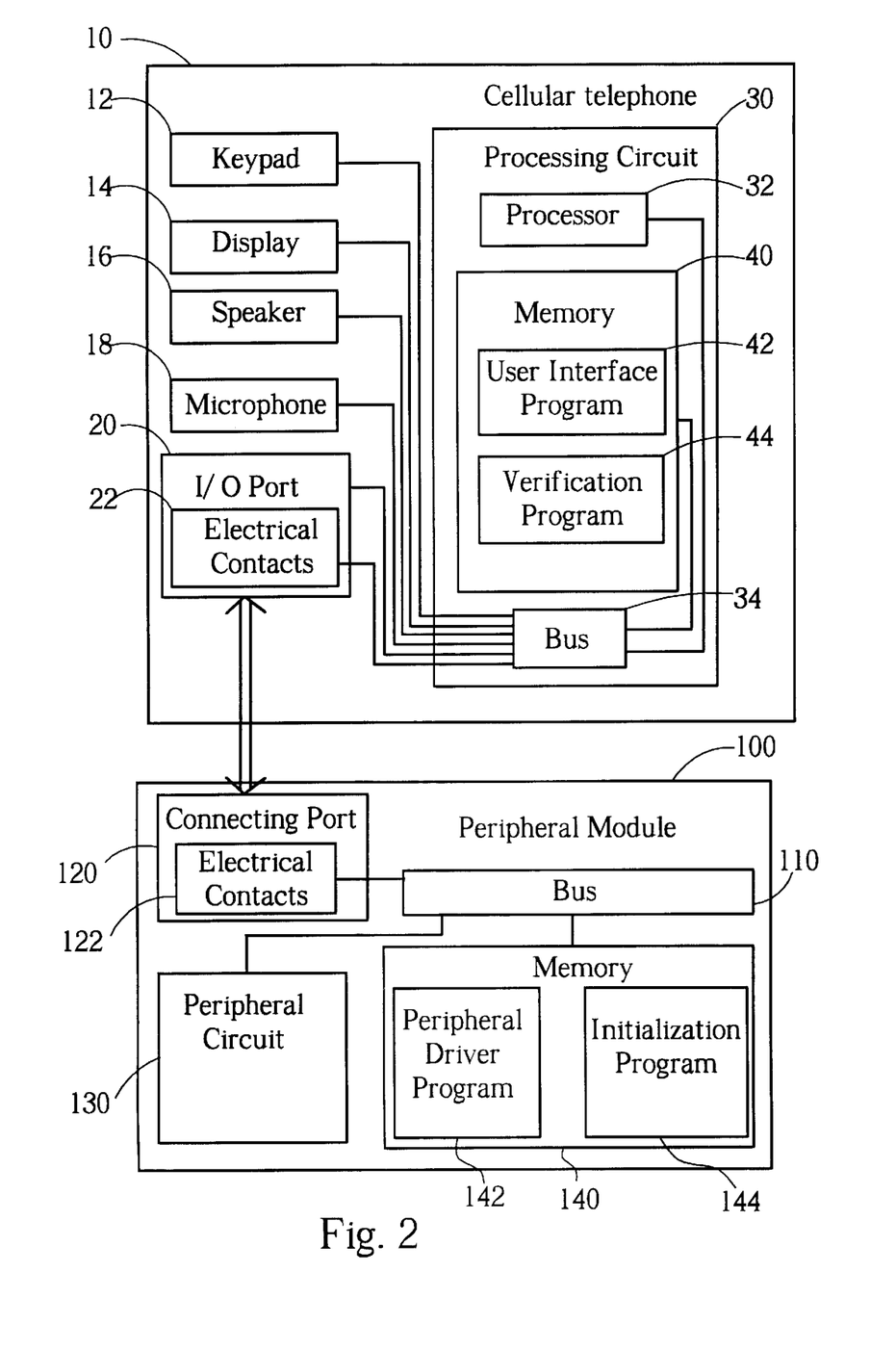
FIG. 2 is a functional block diagram of the cellular telephone and the peripheral module shown in FIG. 1.

Please refer to FIG. 1 and FIG. 2. FIG. 1 is a perspective view of a cellular telephone 10 and peripheral module 100 according to the present invention. FIG. 2 is a functional block diagram of the cellular telephone 10 and the peripheral module 100. The cellular telephone 10 comprises a keypad 12, a display 14, a speaker 16, a microphone 18, an input/output (I/O) port 20 and a processing circuit 30. The processing circuit 30 comprises a processor 32, a bus 34, and a memory 40. The bus 34 is used to interconnect the various electronic components of the cellular telephone 10. Hence, the keypad 12, display 14, speaker 16, microphone 18, and input/output (I/O) port 20 are electrically connected to the processing circuit 30 via the bus 34. Similarly, the memory 40 and processor 32 are electrically connected to the bus 34. The processing circuit 30 controls the operations of the cellular telephone 10. Specifically, by using the bus 34, the processor 32 is able to connect to and control the other electronic elements of the cellular telephone 10.

The keypad 12 comprises a plurality of keys 11. These keys 11 can be depressed by the user to provide input to the cellular telephone 10. The display 14, typically a liquid crystal display (LCD), is controlled by the processing circuit 30 and provides visual output to the user. Such output may involve, for example, a phone number being dialed, current option settings, etc. The speaker 16 is also controlled by the processing circuit and provides audio output to the user. This audio output can include beeps when keys 11 are pressed, ringing sounds for an incoming call, etc. The microphone 18 provides audio input to the cellular telephone 10 from the user. Usually, this input is used to carry on a telephone conversation, but it can also be used to actively control the cellular telephone 10 via voice recognition software (not shown).

The memory 40 holds memory and data that are required for the operations of the processor 32. In particular, the memory 40 comprises a user interface program 42 and a verification program 44. The user interface program 42 accepts user input from the keypad 12, and possibly from the microphone 18. The user interface program 42 then controls the contents of the display 14 based upon this user input, as well as controlling the speaker 16. For example, when a user presses an "8" on the keypad 12, the user interface program 42 may cause the speaker 16 to beep, and may cause an "8" to appear on the display 14. The verification program 44 is used to verify that a proper peripheral module 100 is electrically connected to the cellular telephone 10, and will be discussed in more detail later.

The I/O port 20 is used to provide an electrical connection to the peripheral module 100. When plugged into the I/O port 20, the peripheral module 100 establishes an electrical connection with the processing circuit 30. The connection is established by way of a plurality of electrical contacts 22 in the I/O port 20. These electrical contacts 22 are electrically connected to the bus 34 of the cellular telephone 10. Hence, signal and power lines of the bus 34 are represented as electrical contacts 22 in the I/O port 20.

The peripheral module 100 has a connecting port 120 that corresponds to the I/O port 20. These two ports connect together both mechanically and electrically. Various methods may be employed to do this. For example, the peripheral module 100 may clip into locking holes 24 of the I/O port 20 to establish a mechanical connection. Similarly, to establish the electrical connection, the connecting port 120 of the peripheral module 100 can have a plurality of electrical contacts 122 that electrically connect to corresponding electrical contacts 22 in the I/O port 20. In this manner, a bus 110 of the peripheral module 100, which is electrically connected to the contacts 122, establishes an electrical connection with the bus 34 of the cellular telephone 10.

The peripheral module 100 has a peripheral circuit 130 that is electrically connected to the bus 110, and hence to the connecting port 120. Because of this, when the two busses 110 and 34 of the peripheral module 100 and cellular telephone 10, respectively, are electrically connected together, the peripheral circuit 130 can access the various electronic components of the cellular telephone 10. Likewise, the processing circuit 30 can access the peripheral circuit 130. Consequently, the peripheral circuit 130, once connected to the cellular telephone 10 via the connecting port 120 and the I/O port 20, becomes an integral component of the cellular telephone 10. The peripheral circuit 130 performs a peripheral function to enhance the basic functionality of the cellular telephone 10.

Additionally, the peripheral module 100 has a memory 140, which is also connected to the connecting port 120 via the bus 110. Consequently, the memory 140 of the peripheral module 100 becomes an extension of the memory 40 of the cellular telephone 10 when the peripheral module 100 is connected to the cellular telephone 10. The memory 140 comprises a peripheral driver program 142 and an initialization program 144.

The peripheral driver program 142 can be executed by the processor 32, and is used to control and support the functionality of the peripheral circuit 130. That is, the peripheral driver program 142 helps to integrate the functionality of the peripheral circuit 130 with the cellular telephone 10 by interfacing with the user interface program 42 to provide additional user interfaces to support the new functions offered by the peripheral circuit 130. Additionally, the peripheral driver program 142 controls the operations of the peripheral circuit 130. Such control is effected on behalf of the user, in response to input from the user. The initialization program 144 is generally only executed once when the peripheral module 100 is connected to the cellular telephone 10, and is used to initialize the peripheral circuit 130 and perform basic setup services.

As shown in FIG. 1, the peripheral module 100 clips onto the bottom of the cellular telephone 10. This is not a key point of the present invention. In fact, the peripheral module 100 could fasten onto a side of the cellular telephone 10, or could even be inserted internally, requiring a temporary removal of the cover of the cellular telephone 10 to install. However, the preferred embodiment of the present invention envisions the peripheral module 100 as clipping onto the bottom of the cellular telephone 10. Often, though, other devices may fasten into the area that is covered by the peripheral module 100. For example, the cellular telephone 10 may have a power supply socket 13 for recharging a battery, and it would be covered by the peripheral module 100. This does not have to be a problem, though, as the peripheral module 100 can be designed to pass through previous interfaces. For example, the peripheral module 100 can have a plug 103 that plugs into the socket 13. The plug 103 can pass through the peripheral module 100 to present an equivalent socket 113. Hence, when the peripheral module 100 is connected to the cellular telephone 10 and is covering an interface, i.e., the socket 13, the peripheral module 100 presents an equivalent interface, i.e., the socket 113, which the user can utilize.

The cellular telephone 10 must detect that the peripheral module 100 has been plugged into the I/O port 20, or that the peripheral module 100 is already plugged into the I/O port 20 when the cellular telephone 10 powers up. Several methods can be employed to do this. For example, the processor 32 may periodically read a memory address on the bus 34 that is known to correspond to a reserved memory location within the peripheral module 100. The return value of the read operation would indicate whether or not the peripheral module 100 had been plugged into the I/O port 20. In the preferred embodiment, though, the peripheral circuit 130, once fully connected to the bus 34 via the I/O port 20, and fully energized, will toggle a signal line on the bus 34 to generate an interrupt of the processor 32. When thusly interrupted, the processor 32 will execute the verification program 44. Consequently, the verification program 44 is executed immediately after the peripheral module 100 is plugged into the cellular telephone 10.

The purpose of the verification program 44 is to ensure that a properly configured peripheral module 100 has been plugged into the cellular telephone 10. This is necessary as the peripheral module 100 will become an integral part of the cellular telephone 10, and if it is of an improper type it could detrimentally effect the operations of the cellular telephone 10. Furthermore, false "plug-in" interrupts could possibly be sent to the processor 32, and if they are not caught, i.e., by using the verification program 44, they could lead to a systems failure of the cellular telephone 10.

The verification program 44 may be as simple as required to catch false "plug-in" signals, or it may be a relatively complicated task, involving secure transactions (public and private keys, etc.) to ensure that only authorized peripheral modules 100 are accepted by the cellular telephone 10. The preferred embodiment envisions a simple checksum of certain memory locations within the memory 140 of the peripheral module 100 to catch false "plug-in" signals. For example, the peripheral module 100 may be designed so that its memory 140 maps into the memory 40 of the cellular telephone 10 at a specific address, say 0x80000000. The first six bytes, i.e., 0x80000000 to 0x80000005, may contain pseudo-random numbers, and the next two bytes would hold the sum of the first six bytes. The verification program 44 would verify that the sum of the first six bytes at 0x80000000 matched the 16-bit sum held at 0x80000006. If the checksum condition passes, the verification program 44 then executes the initialization program 144 within the peripheral module 100. Otherwise, the verification program 44 can instruct the user interface program 42 to send a warning message to the user.

When executed by the processor 32, the primary purpose of the initialization program 144 is to initialize the peripheral circuit 130, and to integrate the software of the peripheral driver program 142 with the software of the cellular telephone 10. Specifically, the initialization program 144 must link with the user interface program 42. Any number of methods may be employed to do this, and they will all depend on the specific organizational structure of the user interface program 42. A simple illustration of this shall be given below, in line with the example given above.

Figure 3:
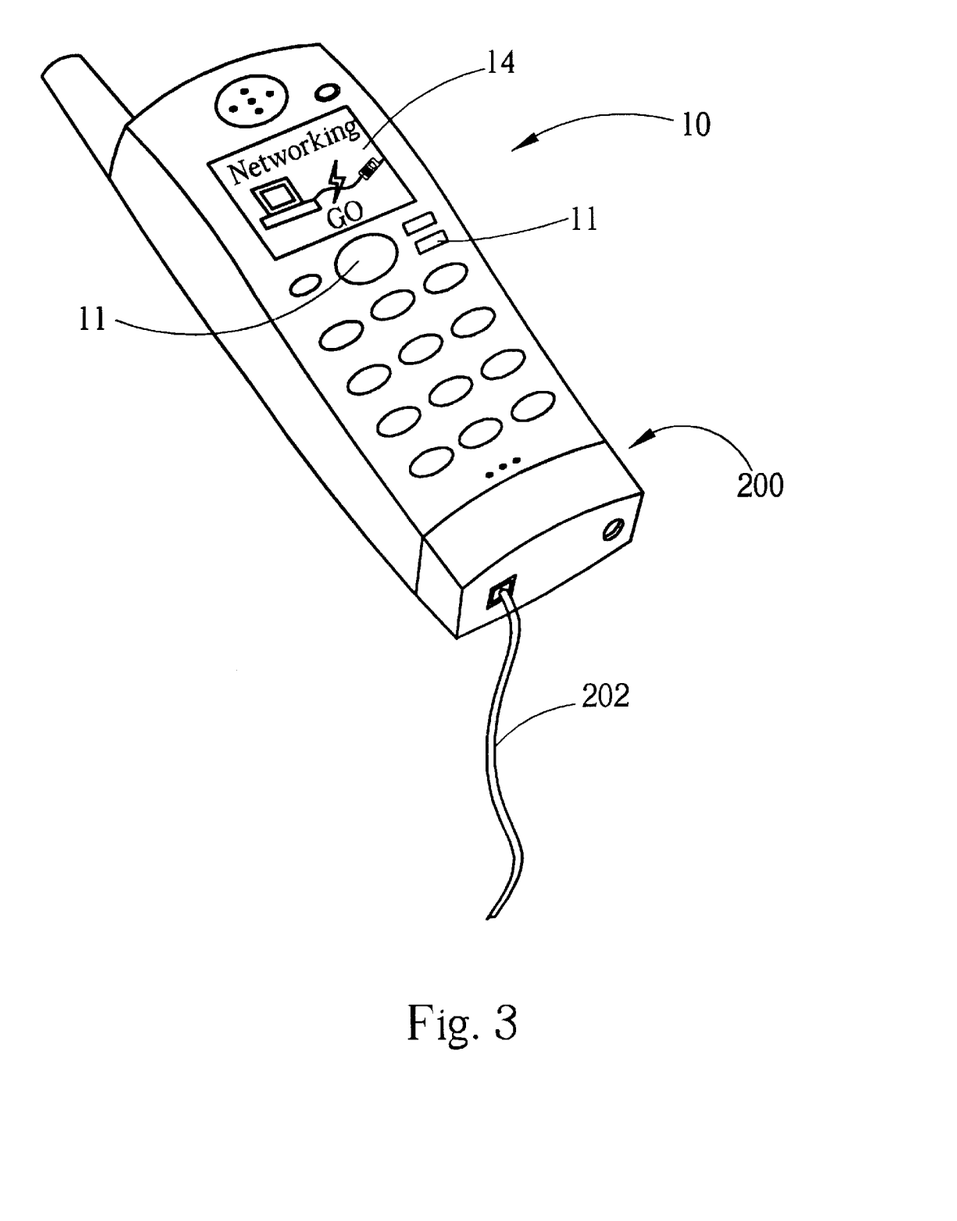
FIG. 3 is a perspective view of a networking embodiment of a present invention peripheral module.
Figure 4:
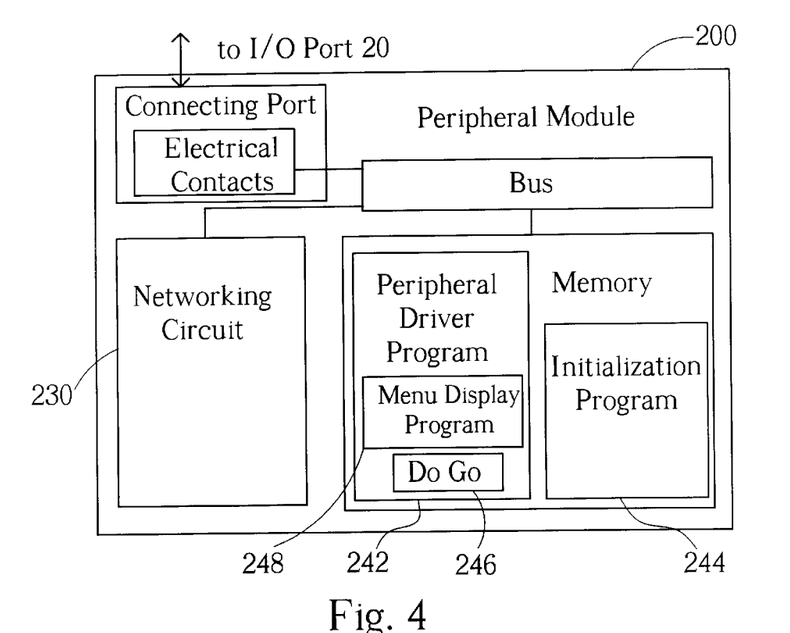
FIG. 4 is a functional block diagram of the peripheral module shown in FIG. 3.

After passing the verification program 44, the verification program 44 may jump to a specific memory location within the peripheral module 100 that is reserved as the starting location of the peripheral driver program 142. For example, 0x90000000 may be reserved as the starting location of the initialization program 144. The verification program 44, then, jumps to 0x90000000. The processing circuit 30 thus begins to execute the initialization program 144. The initialization program 144 performs whatever is required to initialize the peripheral circuit 130, and to link up with the user interface program 42. For example, the initialization program 144 may call a peripheral display registering function within the user interface program 42 to register the location of a function within the peripheral driver program 142 that is responsible for controlling the display 14 in all peripheral module 100 related areas. Once finished, the initialization program 144 can return execution of the processor 32 back to the user interface program Once registered with the user interface program 42, the functionality of the peripheral module 100 becomes available to the user. Please refer to FIG. 3 and FIG. 4. FIG. 3 considers an embodiment of the present invention wherein a peripheral module 200 is a network interface module for connecting the cellular telephone 10 to a network, such as a local area network. The connection could be wireless, such as an infrared or Bluetooth connection, or through a cable. In FIG. 3, the connection is depicted as through a cable 202. FIG. 4 is a functional block diagram of the peripheral module 200. In this case, the peripheral circuit is a networking circuit 230.

The user can press a key 11 to page through the various menu options of the cellular telephone 10. These options are shown on the display 14. Normally, the cellular telephone 10 has no networking option. However, after the peripheral module 200 is plugged into the cellular telephone 10, and it passes the verification program 44, it registers itself with the user interface program 42 when the initialization program 244 is executed. Amongst other things, a new menu option is registered with the user interface program 42 by the initialization program 244, which gives the user interface program 42 the memory location of a menu display program 248 within the peripheral driver program 242. Consequently, as the user scrolls through the various menu options, the user interface program 42 eventually calls the menu display program 248. The menu display program 248 then controls the display 14 to present the image as shown in FIG. 3. Similarly, a "Do Go" function 246 can be registered by the initialization program 244 with the user interface program 42. When the user presses a key 11 that corresponds to the "Go" shown on the display 14, the user interface program 42 will cause the "Do Go" function 246 within the peripheral driver program 242 to be executed by the processing circuit 30. When this occurs, the peripheral driver program 242 can take over the display 14 and user interface operations of the cellular telephone 10 to enable the user to take advantage of the new networking functionality of the peripheral module 200.

As another example of a peripheral expansion circuit and associated software made available through a peripheral module of the present invention, the peripheral module could be a loud speaker for broadcasting audio signals to the user. If also equipped with a suitable microphone and anti-feedback circuitry, such a peripheral module could enable the cellular telephone 10 to behave like a speakerphone.

Figure 5:
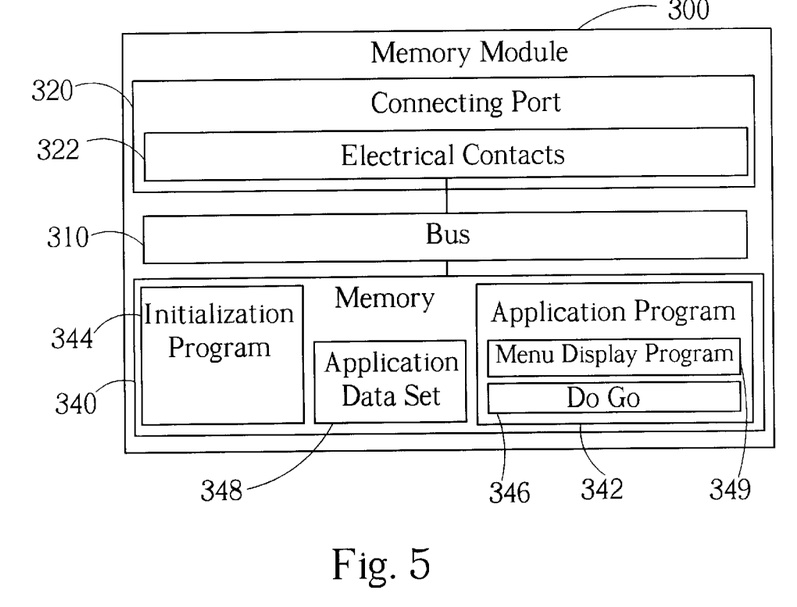
FIG. 5 is a functional block diagram of a memory module embodyment of a present invention module.

The peripheral module does not necessarily have to have a dedicated peripheral circuit to perform a function. In fact, the peripheral module could just act purely as a memory module that provides memory or software enhancements to the cellular telephone. Please refer to FIG. 5. FIG. 5 is a functional block diagram of a memory module 300. The memory module 300 is almost identical to the peripheral module 100 of FIGS. 1 and 2, except that it has no peripheral circuit 130. Like the peripheral modules 100 and 200, the memory module 300 plugs into the I/O port 20 of the cellular telephone 10.

The memory module 300 comprises a connecting port 320 with electrical contacts 322 for connecting to, and establishing an electrical contact with, the I/O port 20. The contacts 322 are electrically connected to a bus 310, and thus the bus 310 of the memory module 300 connects to, and becomes an extension of, the bus 34 of the cellular telephone 10. The memory 340 within the memory module 300 is electrically connected to the bus 310, and so becomes an extension of the memory 40 of the cellular telephone 10. The memory 340 comprises an application program 342, an application data set 348 and an initialization program 344.

As in the previous examples, after the memory module 300 is detected by the cellular telephone 10, the verification program 44 is run to verify the contents of the memory module 300. As before, in the preferred embodiment, a checksum is performed on memory locations within the memory 340. Hence, a checksum is performed on either the application program 342 or the application data set 348, or even on the initialization program 344. If the verification procedure passes, then the processing circuit 30 will begin executing the initialization program 344 within the memory 340.

The initialization program 344 performs whatever initialization procedures that are required upon the application data set 348, and links the application program 342 with the user interface program 42 of the cellular telephone. For example, as was done in the previous embodiment, the initialization program 344 can register, amongst other things, a menu display program 349 and a "Do Go" program 346 with the user interface program 42. The menu display program 349, when called, would cause an appropriate image to be drawn on the display 14 to inform the user of the purpose of the application program 340. When the user interface program 42 calls the "Do Go" program 346 in response to a key press on the keypad 12, the "Do Go" program would cause the application program 342 to execute so as to perform the application function. When executing, the application program 342 can control the contents of the display 14 to present visual data to the user, can obtain user input from the keypad 12, and can use the speaker 16 to provide audio data to the user.

Figure 6:
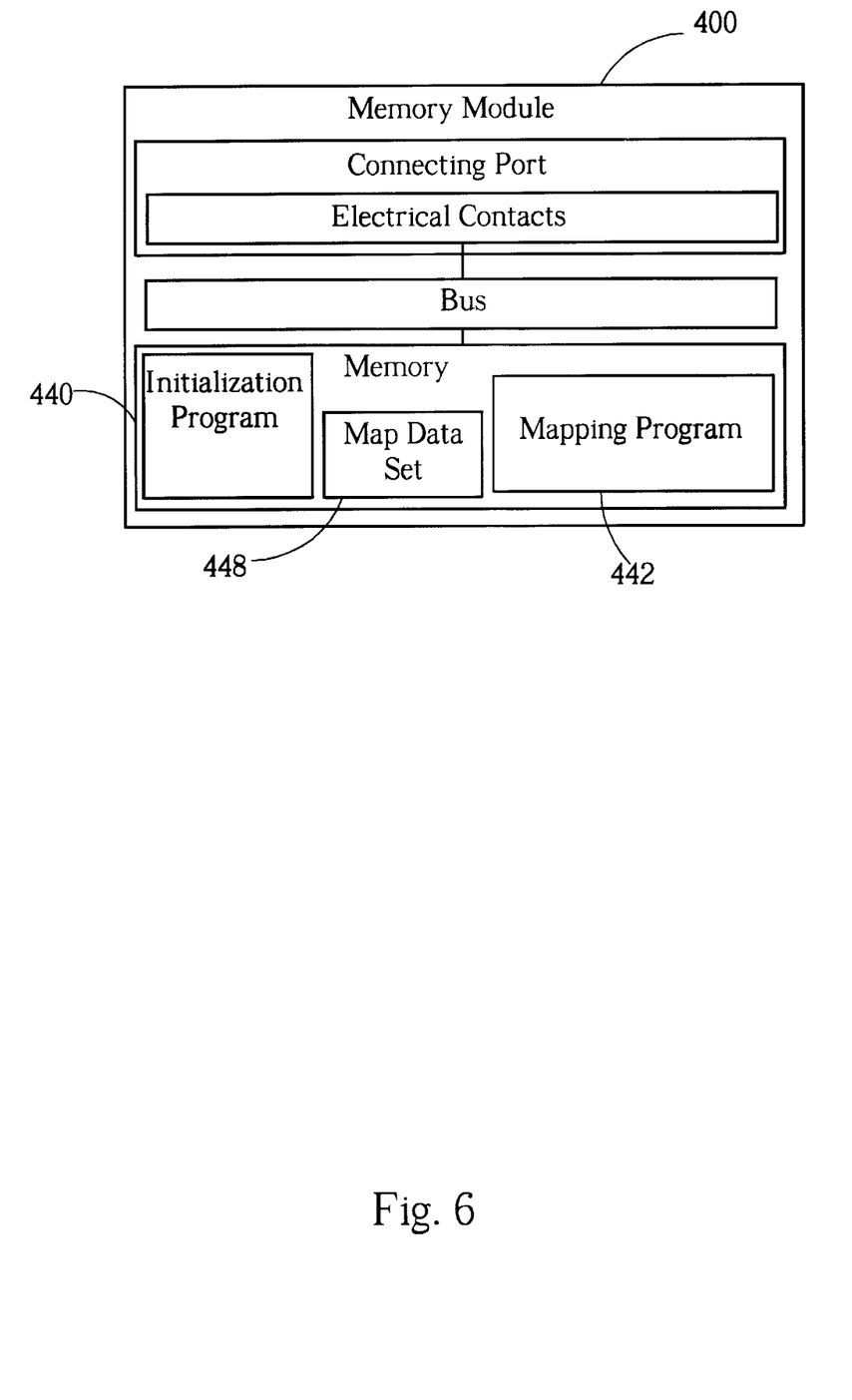
FIG. 6 is a functional block diagram of an application using the memory module of FIG. 5.

An example of such an application program is shown in FIG. 6. A memory module 400 with a memory 440 provides mapping functionality to the user via the display 14. In this case, the application data set is a map data set 448, and comprises the necessary map data. The application program is a mapping program 442, which presents the map data 448 in various ways according to input received from the user.

As another example, the memory module could provide background music to a user while talking on the telephone.

In this case, the application data set would be music data, and the application program would play the music data on the speaker 16 of the cellular telephone 10.

As a final example, the memory module could provide a game service to the user. In this case, the application data set would have all the necessary game data (bit-mapped images, etc.), and the application program would be gaming software. A truly ambitious gaming module might actually combine the memory module embodiments with the peripheral device embodiments to offer a gaming module with a dedicated input device, such as a trackball, touch pad or additional buttons.

In contrast to the prior art, the present invention cellular telephone can accept various types of modules to enhance and broaden its functionality. By doing so, the present invention defers obsolescence and provides a less expensive means for a user to obtain the most up-to-date options for the cellular telephone.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A peripheral module for enhancing the functionality of a cellular telephone, the cellular telephone comprising:
    a processing circuit for controlling the operations of the cellular telephone;
    a keypad having a plurality of keys and electrically connected to the processing circuit to provide input from a user;
    a display electrically connected to the processing circuit to provide visual output to the user;
    a speaker electrically connected to the processing circuit to provide audio output to the user;
    a microphone electrically connected to the processing circuit to provide audio input from the user, and
    an input/output (I/O) port electrically connected to the processing circuit; the peripheral module comprising:
        a peripheral circuit for performing a peripheral function;
        a memory with a peripheral driver program stored in the memory for controlling operations of the peripheral circuit;
        a connecting port for connecting the peripheral circuit and the memory to the I/O port of the cellular telephone; and
        an initialization program stored in the memory of the peripheral module wherein when the connecting port of the peripheral module is connected to the I/O port of the cellular telephone, the initialization program will be executed by the processing circuit of the cellular telephone to initialize the peripheral circuit of the peripheral module;
    wherein after the connecting port of the peripheral module is electrically connected to the I/O port of the cellular telephone, the processing circuit can execute the peripheral driver program stored in the memory of the peripheral module to control the operations of the peripheral circuit go as to perform the peripheral function.

2. The peripheral module of claim 1 wherein the processing circuit of the cellular telephone comprises a verification program wherein before the peripheral circuit is initialized by the initialization program, the verification program will be executed by the processing circuit of the cellular telephone to verify the peripheral function of the peripheral circuit.

3. The peripheral module of claim 1 wherein the processing circuit of the cellular telephone comprises a user interface program for controlling the display to provide output to the user and for receiving input from the keypad.

4. The peripheral module of claim 3 wherein when the connecting port of the peripheral module is connected to the I/O port of the cellular telephone, the user interface program will display a message on the display about the peripheral module and the user can control the peripheral module through the keypad and the user interface program.

5. The peripheral module of claim 1 wherein the peripheral module is a network interface module for connecting the cellular telephone to a local area network through a physical link or through wireless communications.

6. The peripheral module of claim 1 wherein the peripheral module is a loud speaker for broadcasting audio signals to the user.

7. A memory module for enhancing the functionality of a cellular telephone, the cellular telephone comprising:
    a processing circuit for controlling the operations of the cellular telephone;
    a keypad having a plurality of keys and electrically connected to the processing circuit to provide input from a user;
    a display electrically connected to the processing circuit to provide visual output to the user;
    a user interface program stored in the processing circuit for controlling the display to provide output to the user and for receiving input from the keypad;
    a speaker electrically connected to the processing circuit to provide audio output to the user;
    a microphone electrically connected to the processing circuit to provide audio input from the user; and
    an input/output (I/O) port electrically connected to the processing circuit;
    the memory module comprising:
        an internal memory with at least one application program ad at least one application data set stored in it for performing an application function;
        a connecting port for connecting the internal memory to the I/O port of the cellular telephone; and
        an initialization program stored in to internal memory of the memory module wherein when the connecting port of the peripheral module is connected to the I/O port of the cellular telephone, the initialization program will be executed by the processing circuit of the cellular telephone to initialize the memory module;
    wherein after the connecting port of the peripheral module is electrically connected to the I/O port of the cellular telephone, the user interface program will display message on the display about the memory module and the user can execute or interact with the application program through the keypad and the user interface program.

8. The memory module of claim 7 wherein the processing circuit of the cellular telephone comprises a verification program wherein before the memory module is initialized by the initialization program, the verification program will be executed by the processing circuit of the cellular telephone to verify the application program and the application data set stored in the internal memory.

9. The memory module of claim 8 wherein the verification program performs a checksum over the application program or the application data set stored in the internal memory of the memory module.

10. The memory module of claim 7 wherein the application program can provide visual output through the display of the cellular telephone to the user or provide audio output through the speaker of the cellular telephone to the user.

11. The memory module of claim 7 wherein the application data set is a map data set and the application program is mapping software for providing map information to the user on the display.

12. The memory module of claim 7 wherein the application data set is a game data set and the application program is game software for providing a game service to the user on the display.

13. The memory module of claim 7 wherein the application data set is a music data set and the application program is music playing software for providing background music over the speaker to the user.

\* \* \* \* \*